United States Patent
Zhang et al.

(10) Patent No.: US 9,287,955 B2
(45) Date of Patent: *Mar. 15, 2016

(54) MULTI-USER MULTI-STREAM BEAMFORMING METHOD, APPARATUS, AND BASE STATION

(71) Applicant: FUJITSU LIMITED, Kawasaki-shi, Kanagawa (JP)

(72) Inventors: Yi Zhang, Beijing (CN); Hua Zhou, Beijing (CN); Jianming Wu, Beijing (CN); Aihuang Guo, Shang Hai (CN); Wei Luo, Shang Hai (CN)

(73) Assignee: FUJITSU LIMITED, Kawasaki (JP)

( * ) Notice: Subject to any disclaimer, the term of this patent is extended or adjusted under 35 U.S.C. 154(b) by 182 days.

This patent is subject to a terminal disclaimer.

(21) Appl. No.: 14/090,466

(22) Filed: Nov. 26, 2013

(65) Prior Publication Data
US 2014/0086086 A1 Mar. 27, 2014

Related U.S. Application Data

(63) Continuation of application No. PCT/CN2011/074785, filed on May 27, 2011.

(51) Int. Cl.
*H04B 7/06* (2006.01)
*H04W 72/08* (2009.01)
*H04B 7/04* (2006.01)

(52) U.S. Cl.
CPC ............ *H04B 7/0617* (2013.01); *H04B 7/0452* (2013.01); *H04B 7/0456* (2013.01); *H04W 72/082* (2013.01)

(58) Field of Classification Search
CPC .. H04B 7/0617; H04B 7/0452; H04W 72/082
USPC .......................................... 370/252, 328, 329
See application file for complete search history.

(56) References Cited

U.S. PATENT DOCUMENTS 8,098,755 B2 * 1/2012 Kim et al. ..................... 375/267
8,181,076 B2 * 5/2012 Lou et al. ...................... 714/748

(Continued)

FOREIGN PATENT DOCUMENTS

| CN | 1909438 | 2/2007 |
| CN | 101754347 | 6/2010 |

OTHER PUBLICATIONS

International Search Report issued for corresponding International Patent Application No. PCT/CN2011/074785, mailed Mar. 8, 2012.
First Notification of Office Action issued by the State Intellectual Property Office of China for corresponding Chinese Patent Application No. 201180063791.7, dated May 21, 2015, with an English translation.

*Primary Examiner* — Rasheed Gidado
(74) *Attorney, Agent, or Firm* — Myers Wolin, LLC

(57) ABSTRACT

The present invention relates to a multi-user multi-stream beamforming method and apparatus, and a base station. The multi-user multi-stream beamforming method includes the steps of: a) calculating a beamforming matrix of each user in the multi-user according to a minimum leakage principle; b) determining a user average Signal to Leakage Noise Ratio (SLNR) of the multi-user according to the beamforming matrix of each user; c) determining whether the user average SLNR is stable, and if the user average SLNR is not stable, returning to step a) to recalculate the beamforming matrix of each user by using the calculated beamforming matrix of each user.

12 Claims, 7 Drawing Sheets

(56) References Cited

U.S. PATENT DOCUMENTS

| | | | |
|---|---|---|---|
| 8,228,810 B2 * | 7/2012 | Zhou et al. | 370/252 |
| 8,416,738 B2 * | 4/2013 | Shin et al. | 370/328 |
| 8,467,334 B2 * | 6/2013 | Sohn et al. | 370/328 |
| 8,683,284 B2 * | 3/2014 | Fujii | 714/748 |
| 8,842,606 B2 * | 9/2014 | Denteneer et al. | 370/328 |
| 2008/0075196 A1 | 3/2008 | Kim et al. | |
| 2009/0322614 A1 | 12/2009 | Na et al. | |
| 2011/0176633 A1 * | 7/2011 | Ojard et al. | 375/295 |
| 2011/0205968 A1 * | 8/2011 | Kim et al. | 370/328 |

\* cited by examiner

MULTI-USER MULTI-STREAM BEAMFORMING METHOD, APPARATUS, AND BASE STATION

CROSS-REFERENCE TO RELATED APPLICATIONS

This is a continuation of International Application No. PCT/CN2011/074785, filed on May 27, 2011, the contents of which are herein wholly incorporated by reference.

TECHNICAL FIELD

The present invention belongs to the field of wireless communication technologies, and particularly, to a multi-user multi-stream beamforming method, an apparatus, and a base station using the same.

BACKGROUND

The Multiple-Input Multiple-Output (MIMO) technology improves the communication system capacity and the spectrum efficiency several times over by using a space-time signal processing technology and a spatial freedom degree generated by configuring a plurality of antennas at receiving and transmitting ends, without increasing the bandwidth and the antenna transmission power. The Smart Antennas (SA) technology can generate a space directional beam by using a digital signal processing technology, so as to effectively suppress an interference signal, and greatly improve the spectrum efficiency and the channel capacity. The beamforming technology can perform a signal preprocessing by weighting the antenna array according to the channel characteristics of the user, and has the ability of extending the coverage, improving the system capacity and reducing the interference. The multi-antenna multi-stream beamforming technology combines the MIMO with the SA technology, so as to efficiently utilize airspace resources, and realize space multiplexing by transmitting a plurality of beamforming data streams simultaneously without increasing the power or sacrificing the bandwidth, thereby improving the channel capacity of the wireless communication system, and achieving high-speed and reliable information transmission.

The single-user multi-stream beamforming technology enables a single user to perform transmission of multiple data streams at certain timing, and obtain a beamforming gain and a spatial multiplexing gain, thereby achieving a higher transmission rate than the conventional single-stream beamforming technology. The conventional double-stream beamforming technology only supports two data streams, and when the adopted algorithms such as Singular Value Decomposition (SVD) based on channel decomposition are applied from the double-stream to the multi-stream, the system performance will be largely degraded under the influence of the effective eigenvalue of the channel. Therefore, the algorithm requirement of the multi-stream beamforming is quite different from that of the double-stream beamforming.

As compared with the single-user multi-stream beamforming technology, the multi-user multi-stream beamforming technology brings a higher total system capacity by using the multi-user diversity effect, and also achieves the simultaneous transmission of more user data streams. But the multi-user causes new problems such as inter-user interference. In the conventional multi-user MIMO technology based on block diagonalization and Signal to Leakage Noise Ratio (SLNR) algorithm, all users in the system shall be processed, and the execution of the algorithm requires many matrix inversions or iterations, so the complexity is very high. The primary problem to be solved in the multi-user system is to suppress the multi-user interference in the MIMO channel, and the increase of the user number makes the channel state be more complex and requires a larger overhead of the feedback channel, so it is important to design a more effective multi-user multi-stream beamforming algorithm.

The SLNR-based algorithm proposed by Mirette Sade, et al. expects the received signal power of each user to be calculated to be as large as possible, while the sum of the noise power and the interferences power leaked on other users to be as small as possible, thereby solving the inter-user signal interference, and slowing the mutual interference between the intra-user data streams. The advantage is that the target function tactfully avoids the nesting of the transmitting end weighting matrix among the users, thereby an optimized closed solution being deduced directly. In addition, the solution also breaks the antenna restrictive conditions and has a wider application space.

But during the study of the present invention, the inventor of the present invention finds that the SLNR-based algorithm proposed by Mirette Sade, et al. is just for a single user, without considering the average SLNR of the whole system. Thus, the disadvantage is that the performance of the whole system cannot be optimized under some conditions. In addition, in case that the Signal to Noise Ratio (SNR) of the system decreases, the throughout of the whole system cannot be improved even using the algorithm proposed by Mirette Sade, etc. Moreover, the conventional method does not consider a matching between the precoding vector of the transmitting end and the actually receiving processing vector.

SUMMARY

Thus, the present invention is proposed with respect to the above situation of the relevant art, so as to relieve or eliminate one or more shortages caused by the limitations of the relevant art, and provide at least one beneficial selection.

In order to achieve the above objective, according an aspect of the present invention, a multi-user multi-stream beamforming method is provided, and the method includes the steps of: a) calculating a beamforming matrix of each user in the multi-user according to a minimum leakage principle; b) determining a user average Signal to Leakage Noise Ratio (SLNR) of the multi-user according to the beamforming matrix of each user; c) determining whether the user average SLNR is stable, and if the user average SLNR is not stable, returning to step a) to recalculate the beamforming matrix of each user by using the calculated beamforming matrix of each user.

According another aspect of the present invention, a multi-user multi-stream beamforming method is provided, and the method includes the following steps with respect to each user in the multi-user: a) determining a beamforming matrix of the user; b) determining whether there is a data stream to be retransmitted; and c) when it is determined that there is a data stream to be retransmitted, selecting an optimized beamforming vector from the beamforming matrix of the user and allocating to the data stream.

According still another aspect of the present invention, a multi-user multi-stream beamforming apparatus is provided, and the apparatus includes: a beamforming matrix calculating unit configured to calculate a beamforming matrix of each user in the multi-user according to a minimum leakage principle; a user average SLNR calculating unit configured to determine a user average SLNR of the multi-user according to the beamforming matrix of each user; and a user average SLNR stableness judging unit configured to determine whether the user average SLNR is stable, wherein if the user average SLNR is not stable, the beamforming matrix calculating unit recalculates the beamforming matrix of each user by using the calculated beamforming matrix of each user.

According yet another aspect of the present invention, a multi-user multi-stream beamforming apparatus is provided, and the apparatus includes: a beamforming matrix calculating unit configured to determine a beamforming matrix of each user in the multi-user; a retransmitted data stream judging unit configured to judge whether there is a data stream to be retransmitted with respect to each user in the multi-user; an optimized beamforming vector allocating unit configured to select, when the retransmitted data stream judging unit judges that a user requires a data stream to be retransmitted, an optimized beamforming vector from the beamforming matrix of the user and allocate to the data stream.

The present invention further provides a base station, which uses the aforementioned method or includes the aforementioned apparatus.

The present invention proposes a method for combining the HARQ mechanism with the multi-user multi-stream beamforming. By using the method, the multi-user multi-stream beamforming transmission can be achieved under the LTE-A, while the transmission rate and throughput of the system can be improved.

Furthermore, the present invention proposes a multi-user multi-stream beamforming method which combines the HARQ mechanism with the minimum leakage principle (SLNR) algorithm, thereby achieving the multi-user multi-stream beamforming under the LTE-A, and reducing or even eliminating the inter-user interference. The throughput of the whole system still can be improved even if the system SNR decreases as the power is allocated to more streams for a transmission in case of multi-stream transmission.

According yet another aspect of the present invention, a logic part readable program and a logic part readable tangible storage medium which stores the logic part readable program are provided, wherein when being executed by a logic part, the logic part readable program enables the logic part to work as the beamforming apparatus described herein, or enables the logic part to implement the beamforming method described herein.

To be noted, the term "comprise/include" herein specifies the presence of feature, element, step or component, not excluding the presence or addition of one or more other features, elements, steps or components.

The above generic descriptions and the following detailed descriptions made with reference to the drawings are all schematic, rather than limitations to the protection scope of the present invention.

BRIEF DESCRIPTION OF THE DRAWINGS

From the following detailed descriptions of the present invention made with reference to the drawings, the above and other objectives, features and advantages of the present invention will be understood more clearly. In the drawings, the same or similar reference signs denote the same or similar elements.

DESCRIPTION OF THE EMBODIMENTS

The embodiments of the present invention will be described as follows with reference to the drawings. The descriptions of the embodiments of the present invention are just exemplary, rather than limitations to the protection scope of the present invention. The descriptions of the relevant art not significant to the understanding of the present invention are omitted in the descriptions of the embodiments of the present invention.

Figure 1:
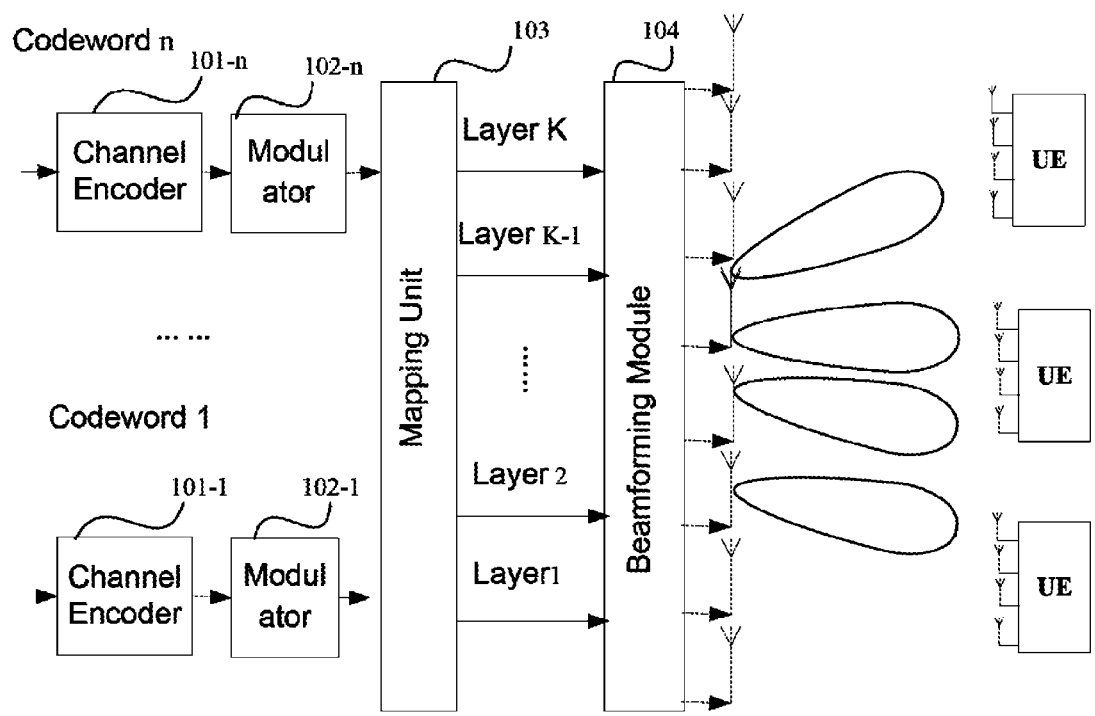
FIG. 1 illustrates a schematic functional block diagram of a base station which can use a multi-user multi-stream beamforming method of the present invention or include a multi-stream beamforming apparatus of the present invention.

FIG. 1 illustrates a schematic functional block diagram of a base station which can use a multi-user multi-stream beamforming method of the present invention or include a multi-stream beamforming apparatus of the present invention. In the block diagram, the description of the base station having little relation to the present invention is omitted. For the convenience of description, FIG. 1 also illustrates a corresponding user (UE, user equipment).

The base station selects a user according to a certain principle, and determines a specific user which performs beamforming, i.e., a user (UE) to which the data is to be transmitted. The user selection principle may be based on the channel state information uploaded by the user, which will not be discussed herein. As illustrated in FIG. 1, signals transmitted to all the communication users are firstly encoded by a channel encoder 101, and the encoded data is modulated by a modulator 102. Next, a mapping from codeword to data layer is performed by a mapping unit 103. Next, the data of each layer is beamformed by a beamforming module 104 and then transmitted through a plurality of transmitting antennas. The user demodulates the received signal, and performs a linear processing on the demodulated received signal, whereby corresponding data is recovered. The beamforming module 104 of the present invention may use the multi-user multi-stream beamforming method of the present invention or include the multi-user multi-stream beamforming apparatus. Although certain parts in the drawing are illustrated as plural, they can also be implemented by a single part.

Figure 2:
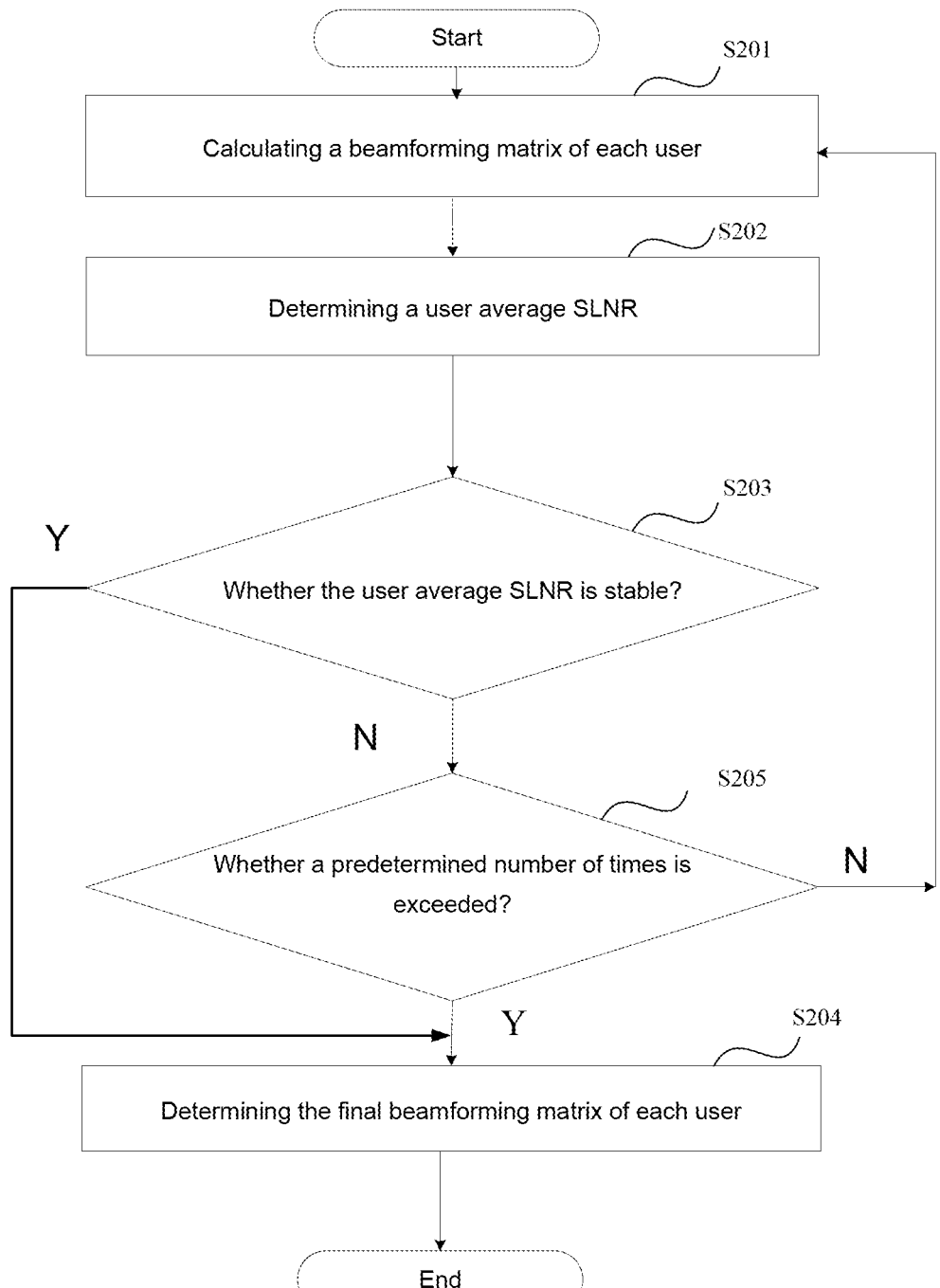
FIG. 2 illustrates a multi-user multi-stream beamforming method according to an embodiment of the present invention.

FIG. 2 illustrates a multi-user multi-stream beamforming method according to an embodiment of the present invention. As illustrated in FIG. 2, firstly in step S201, calculating a beamforming matrix of each user in the multi-user according to a minimum leakage principle. Next, in step S202, determining a user average Signal to Leakage Noise Ratio (SLNR) of the multi-user according to the beamforming matrix of each user. Next, in step S203, determining whether the user average SLNR is stable. If the user average SLNR is stable (Yes in step S203), determining the beamforming matrix of each user calculated in step S201 as the beamforming matrix finally to be used in step S204. Otherwise, if the user average SLNR is unstable (No in step S203), judging whether a predetermined number of times is exceeded in step S205. If it is determined that the predetermined number of times has been exceeded (Yes in step S205), the processing goes to step S204, and determining the beamforming matrix of each user calculated in step S201 as the beamforming matrix finally to be used. If it is determined that the predetermined number of times has not been exceeded yet (No in step S205), the processing returns to step S201 to recalculate the beamforming matrix by using the beamforming matrix having been calculated.

To be noted, step S205 is an optional step. On one hand, viewed in the prospective of system design, the complexity shall be restricted and the tolerance cycle shall be fed back. On the other hand, for some systems, excessive loop iterations are not required due to the factors such as performance requirement. And for some systems, the definition of the number of iterations may not be required.

Figure 3:
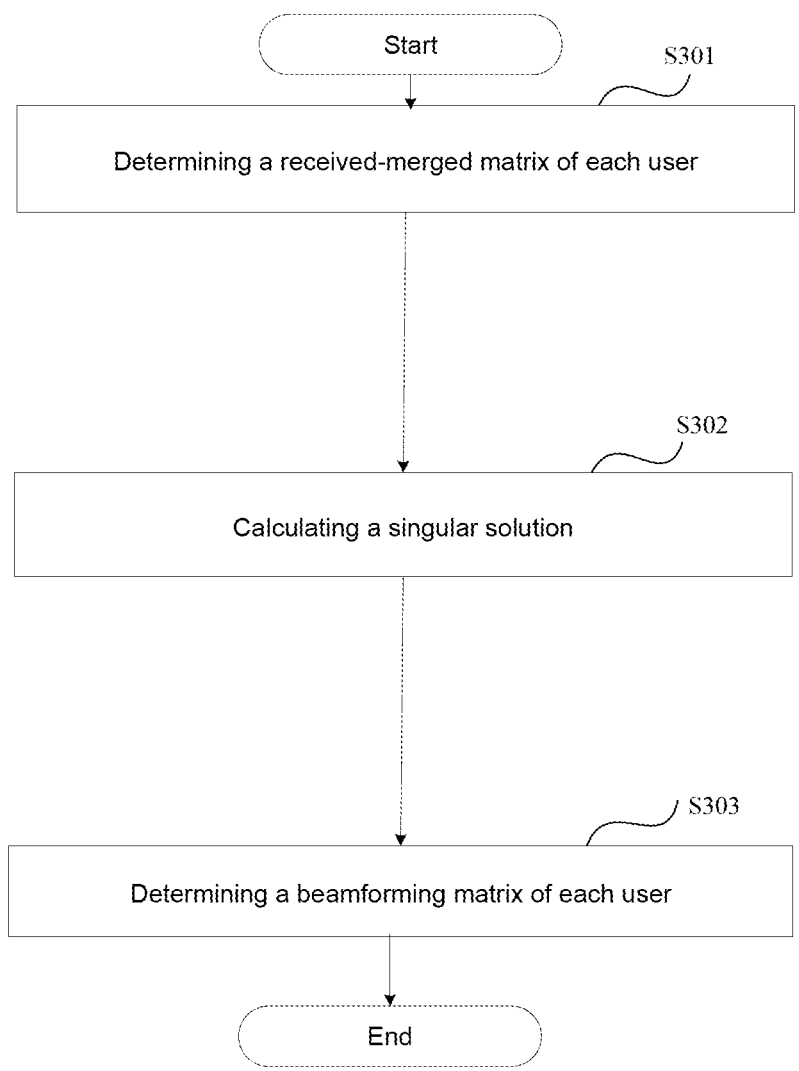
FIG. 3 illustrates an implementation of steps of determining a beamforming matrix of each user according to an embodiment of the present invention.

FIG. 3 illustrates an implementation of step S201 according to an embodiment of the present invention. Firstly in step S301, determining an initial received-merged matrix of each user in the multi-user, or determining an updated received-merged matrix of each user according to the previously iteration calculated beamforming matrix of each user (collectively referred to as determining the received-merged matrix of the user). Next, in step S302, calculating a singular solution based on the initial received-merged matrix or the updated received-merged matrix of each user according to a minimum leakage principle. Next, in step S303, determining a beamforming matrix of each user by using the singular solution.

Figure 4:
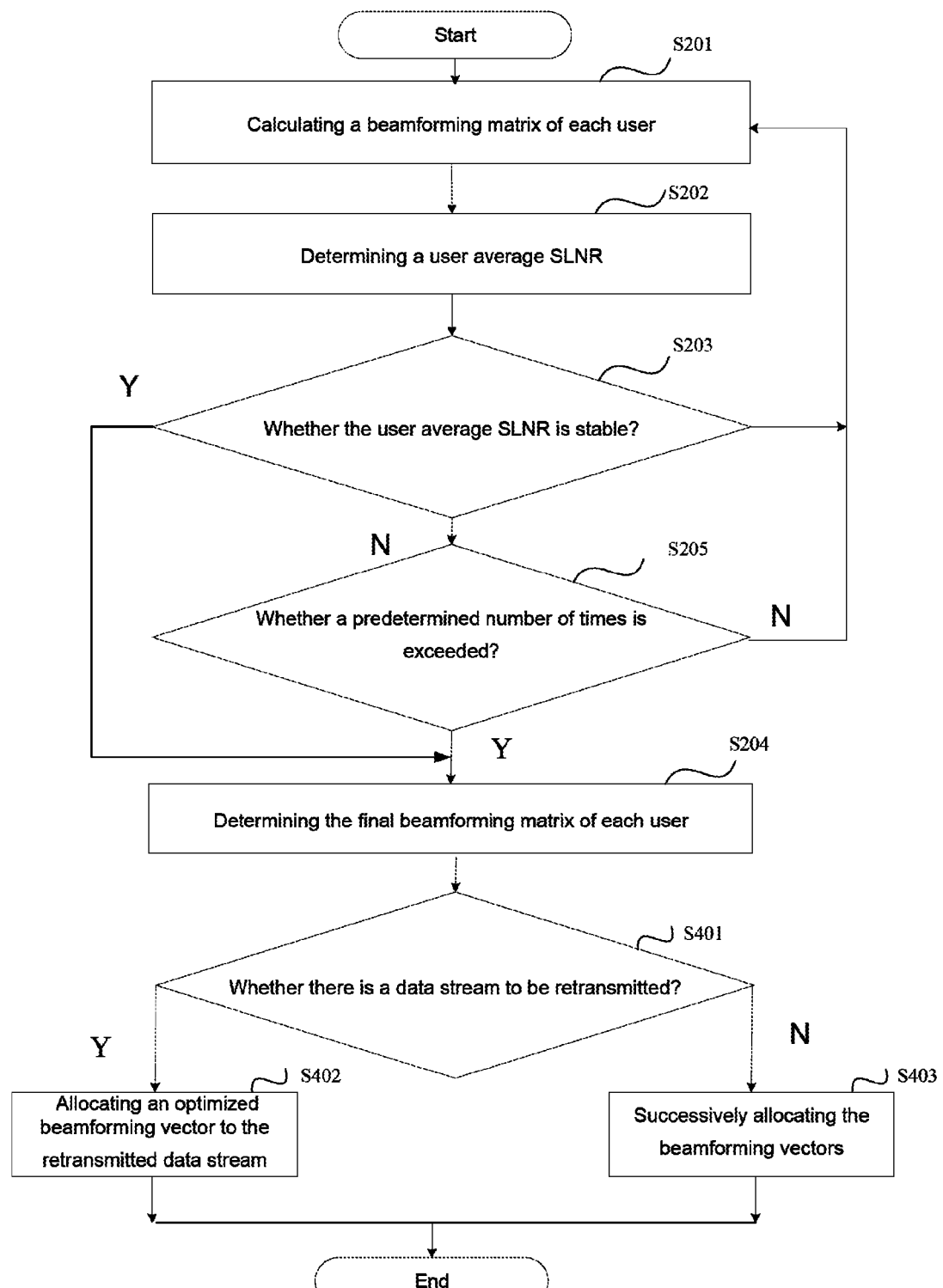
FIG. 4 illustrates a multi-user multi-stream beamforming method according to another embodiment of the present invention.

FIG. 4 illustrates a multi-user multi-stream beamforming method according to another embodiment of the present invention. As compared with the method illustrated in FIG. 2, the method illustrated in FIG. 4 further includes steps S401 and S402. In step S401, with respect to each user in the multi-user, judging whether there is a data stream to be retransmitted. When a user has a data stream to be retransmitted (Yes in step S401), selecting an optimized beamforming vector (corresponding to a channel having good quality) from the beamforming matrix of the user and allocating to the data stream in step S402. When a user has no a data stream to be retransmitted (No in step S401), successively allocating the beamforming vectors in the beamforming matrix of the user in step S403.

Each of the beamforming matrixes may be a precoding matrix.

Figure 5:
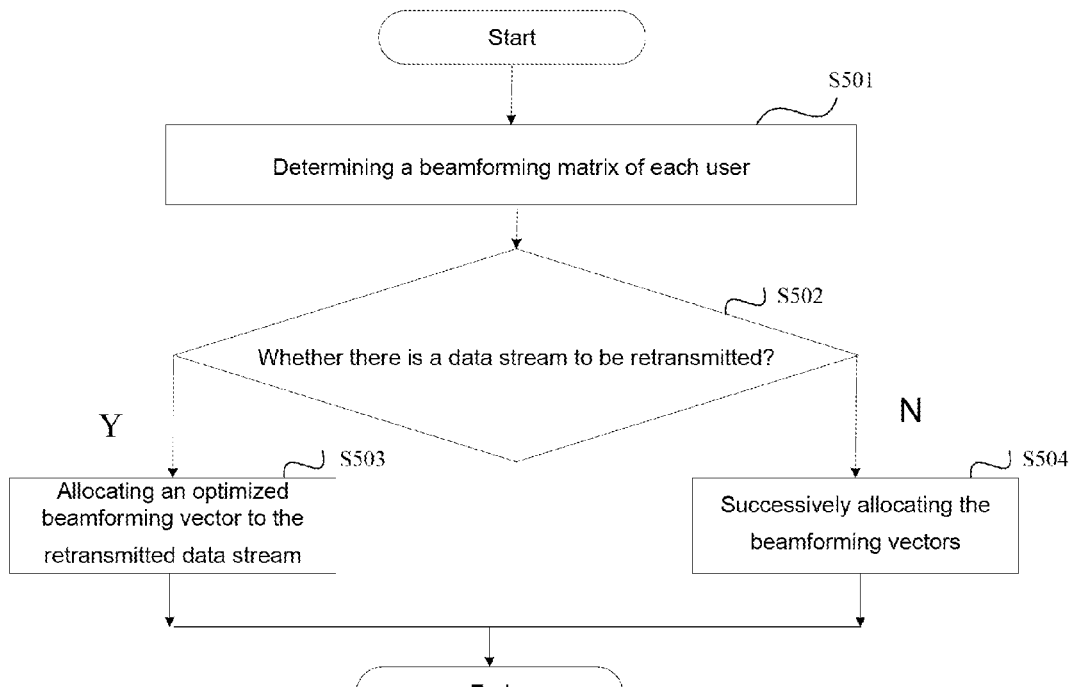
FIG. 5 illustrates a multi-user multi-stream beamforming method according to still another embodiment of the present invention.

FIG. 5 illustrates a multi-user multi-stream beamforming method according to still another embodiment of the present invention.

As illustrated in FIG. 5, with respect to each user in the multi-user, firstly in step S501, determining a beamforming matrix of the user. In this step, the beamforming matrix of the user may be determined according to a minimum leakage principle, or other principle such as MMSE principle. For the method for determining the beamforming matrix according to the MMSE principle, please for example refer to *Introduction to Space-Time Wireless Communication* (Tsinghua University Press, page 140, the 1$^{st}$ edition in 2007 December), which is entirely incorporated herein by reference. Next, in step S502, judging whether there is a data stream to be retransmitted. When there is a data stream to be retransmitted (Yes in step S502), selecting an optimized beamforming vector from the beamforming matrix of the user and allocating to the data stream in step S503. When there is no data stream to be retransmitted (No in step S502), successively allocating the beamforming vectors in the beamforming matrix of the user in step S504.

In a preferred embodiment, the beamforming matrix may also be determined by using the method as illustrated in FIGS. 2-3.

Next, the mathematical reasoning and the implementation method of the multi-user multi-stream beamforming method will be briefly described as follows, for the convenience of further understanding of the present invention, or to meet the requirement about the disclosure in the Chinese Patent Law. But it shall be noted that the following method is mainly performed with respect to a minimum leakage principle, and other principle may also be used at many occasions. The protection scope of the present invention shall be determined by the claims, rather than being restricted by the Description. The description of the method of the present invention can also be adopted to understand the apparatus of the present invention.

Application Scenario of the MU-MIMO System

In the application scenario of the MU-MIMO system, assuming that the number of transmitting antennas is $N_t$, the number of receiving antennas is $N_r$, and there are K receiving users $MS_1$, $MS_2$, ..., $MS_K$ in the system, wherein user $MS_k$ has $m_k$ receiving antennas, i.e., $$N_r = \sum_{k=1}^{K} m_k.$$

Assuming that $s_1$, $s_2$, ..., $s_K$ are information symbols transmitted to K users, respectively, and user $MS_k$ can receive $m_k$ independent data streams, then $s_k$ is a $m_k \times 1$ dimensional vector, i.e., when $s_1$, $s_2$, ..., $s_K$ are all full-rank vectors, the total number $N_s$ of transmission streams realized in the system is $$N_s = \sum_{k=1}^{K} m_k,$$

otherwise it is a sum of the ranks of $s_1$, $s_2$, ..., $s_K$.

When a beamforming is performed for the data of the $k^{th}$ user, for the transmitted symbol $s_k = [s_{k,1}, S_{k,2}, \ldots, s_{k,m_k}]^T$, a $N_t \times m_k$ dimensional beamforming matrix $F_k$ shall be calculated for weighing the transmitted symbol while satisfying $\|F_k\|^2 = 1$. After the beamforming is performed for K users, the data is together transmitted by the transmitting end, and the equation is:

$$x = \sum_{k=1}^{K} F_k s_k \tag{1}$$

The signal received by user k is:

$$y_k = H_k F_k s_k + \sum_{j=1, j\neq k}^{K} H_k F_j s_j + z_k \quad (2)$$

In equation (2), the second item represents the interference from other user on the $k^{th}$ user, $z_k$ represents an additive white noise with a power of $\sigma_k^2$, and $H_k$ is a $m_k \times N_t$ dimensional Rayleigh fading channel matrix:

$$H_k = \begin{bmatrix} h_{1,1}^k & \cdots & h_{1,N_t}^k \\ \vdots & \ddots & \vdots \\ h_{m_k,1}^k & \cdots & h_{m_k,N_t}^k \end{bmatrix} \quad (3)$$

Multi-Stream Beamforming Solution

When a beamforming is performed for the data of the $k^{th}$ user, different beamforming algorithms may be adopted to obtain the beamforming vector matrix $F_k$. Herein only some multi-stream beamforming applications based on the non-codebook beamforming algorithm are discussed.

When a signal is received by user k, it is multiplied by a linear received matrix $W_k$ to obtain a detection signal $\tilde{s}_k$:

$$\tilde{s}_k = W_k y_k \quad (4)$$

$$= W_k H_k F_k s_k + W_k \left( \sum_{j=1, j\neq k}^{K} H_k F_j s_j + z_k \right)$$

After user k estimates a downlink equivalent channel $\tilde{H}_k = H_k F_k$ by using a downlink dedicated reference signal and meanwhile estimates noise power $\sigma_k^2$, the linear received matrix $w_k$ may be deemed as a matched filter:

$$W_k = \frac{(H_k F_k)^H}{\|H_k F_k\|_F} \quad (5)$$

where, $\|\bullet\|_{MF}$ represents Frobenius norm (F norm).

By substituting equation (5) into equation (4), it can be deduced that:

$$\tilde{s}_k = \frac{1}{\|H_k F_k\|_F} F_k^H H_k^H H_k F_k s_k + \frac{(H_k F_k)^H}{\|H_k F_k\|_F} \left( \sum_{j=1, j\neq k}^{K} H_k F_j s_j + z_k \right) \quad (6)$$

In equation (6), the second item is a sum of interferences and noises received by user k. As can be seen from equation (6), the inter-user co-channel interference can be reduced or eliminated by weighing the signal with an appropriate beamforming matrix $F_k'(k\epsilon[1, \ldots, K])$.

Multi-Stream Application of Minimum Leakage Principle (SINR) Algorithm

When a transmitting end simultaneously communicates with multiple users, each user gets influences from all other users, i.e., Common-Channel Interference (CCI), thus the interference and the Signal to Interference and Noise Ratio (SINR) are defined. The inter-user interference means that each user is interfered by the signals from all other users which are in communications at the same time, and it is caused by the reception of the signals from other users. Herein the concept leakage is introduced, which means the interference by each user on all other users. In a certain sense, each user has some signal power leaked to other users, because when a base station transmits a signal to each user, the signal is transmitted to other users too.

According to equation (2), the signal received by the $k^{th}$ user is:

$$y_k = H_k F_k s_k + \sum_{j=1, j\neq k}^{K} H_k F_j s_j + z_k \quad (7)$$

The SLNR principle is a principle based on minimum leakage of the user transmitted signal, i.e., it requires each user to select an appropriate beamforming matrix, which minimizes the total interference of the signal of the user on other users, i.e., which minimizes the leakage of the signal to other users, and the equation is:

$$SLNR_k = \frac{\|H_k F_k\|^2}{m_k \sigma_k^2 + \sum_{j=1, j\neq k}^{K} \|H_j F_k\|^2} \quad (8)$$

As can be seen from equitation (8), when the noise power is given and $SLNR_k$ is small, the total interference of the signal transmitted by user k on other users is large, i.e., the signal leakage is large; otherwise the total interference is small, i.e., the signal leakage is small.

The SLNR herein shall be understood extensively, for example including a signal to leakage interference and noise ratio.

Thus, an optimized beamforming matrix $F_k'(k\epsilon[1, \ldots, K])$ shall be selected to maximize $SLNR_k$, i.e., $$F_k' = \text{argmax } SLNR_k \quad (9)$$

$$= \text{argmax } \frac{\|H_k F_k\|^2}{m_k \sigma_k^2 + \sum_{j=1, j\neq k}^{K} \|H_j F_k\|^2}$$

where, $F_k'$ satisfies $\|F_k'\|^2=1$.

Without loss of generality, assuming that the beamforming matrix $F_k, k=1, 2, \ldots, K$ meets the power constraint condition:

$$tr[F_k^H F_k] = tr[F_k F_k^H] = \|F_k\|_F^2 = m_k \quad (10)$$

where, $tr[\bullet]$ represents the matrix trace. Since $$E[s_k s_k^H] = \frac{1}{m_k} I_m,$$

in the sense of statistical average, the equation of $SLNR_k$ may be simplified as:

$$SLNR_k = \frac{\|W_k H_k F_k\|_F^2}{m_k \|W_k z_k\|_F^2 + \left\|\sum_{j=1, j \neq k}^{K} W_j H_j F_k\right\|_F^2} \quad (11)$$

"□" represents an equivalence in the sense of statistical average; since $E[z_k z_k^H] = \sigma_k^2 I_{m_k}$, $$\|W_k z_k\|_F^2 = tr[W_k z_k z_k^H W_k^H] \square \sigma_k^2 I_m tr[W_k W_k^H] \quad (12)$$

After user k estimates a downlink equivalent channel $\tilde{H}_k = H_k F_2$ by using a downlink dedicated reference signal and meanwhile estimates noise power $\sigma_k^2$, the linear received matrix $w_k$ may be deemed as a matched filter:

$$W_k = \frac{(H_k F_k)^H}{\|H_k F_k\|_F} \quad (13)$$

Thus, $$tr[W_k W_k^H] = tr\left[\frac{(H_k F_k)^H}{\|H_k F_k\|_F} \cdot \frac{H_k F_k}{\|H_k F_k\|_F}\right] \quad (14)$$

$$= \frac{tr[(H_k F_k)^H (H_k F_k)]}{\|H_k F_k\|_F^2} = 1$$

According to equations (10), (11) and (12), it can be deduced that $$SLNR_k \square \frac{tr[F_k^H (H_k^H W_k^H W_k H_k) F_k]}{tr\left[F_k^H \left(\sigma_k^2 I_{m_k} + \tilde{H}_k^H \tilde{H}_k\right) F_k\right]} \quad (15)$$

where, $\tilde{H}_k = [(W_1 H_1)^T, \ldots, (W_{k-1} H_{k-1})^T, (W_{k+1} H_{k+1})^T, \ldots, (W_K H_K)^T]^T$.

In order to obtain optimized system performance, the beamforming matrix and the received-merged matrix to which a maximum value of equation (7) corresponds shall be found. In order to solve the problem, the generalized Rayleigh quotient theory shall be adopted. The following generalized eigenvalue decomposition can be performed:

$$[V_k, D_k] = \text{eig}(H_k^H W_k^H W_k H_k, \sigma_k^2 I_{m_k} + \tilde{H}_k^H \tilde{H}_k) \quad (16)$$

where, the function eig(A,Z) represents performing a generalized eigenvalue decomposition on (A,Z), the column vector of the matrix $V_k$ represents corresponding eigenvector, an element on the diagonal line of a diagonal matrix $D_k$ represents corresponding eigenvalue, $m_k$ represents the number of receiving antennas of user k, I represents a unit matrix, $Im_k$ represents a noise matrix of the $k^{th}$ user. The optimized beamforming matrix $F_k$ shall be composed of normalized eigenvectors to which at most $m_k$ eigenvalues correspond in a left-to-right order, i.e. (assuming that the eigenvalues are arranged in a small-to-large order on the diagonal line of the matrix $D_k$, wherein the minimum eigenvalue is arranged at the top left, and the maximum eigenvalue is arranged at the bottom right):

$$F_k = \left[\frac{V_k(:, \text{end})}{\|V_k(:, \text{end})\|_F}, \ldots, \frac{V_k(:, \text{end} - m_k + 1)}{\|V_k(:, \text{end} - m_k + 1)\|_F}\right] \quad (17)$$

where, "end" represents the last value, and $V_k$ (:, value parameter) represents a column indicated by the value parameter in the matrix $V_k$. Then the received-merged matrix can be calculated according to equation (5).

Thus the iteration algorithm can be performed as follows:
1) initialization: assuming i=0, and the received-merged matrix of each user is:

$$\{W_k^{(i)}\}_{k=1,\ldots,K} = \frac{1}{\sqrt{m_k}} I_{m_k}([1:m_k], :);$$

2) calculating $[V_k, D_k] = \text{eig}(P_k, Q_k)$, $P_k = (W_k^{(i)} H_k)^H W_k^{(i)} H_k$, $Q_k = \sigma_k^2 I_{m_k} + \tilde{H}_k^H \tilde{H}_k$, and $\tilde{H}_k = [(W_1^{(i)} H_1)^T, \ldots, (W_{k-1}^{(i)} H_{k-1})^T, (W_{k+1}^{(i)} H_{k+1})^T, \ldots, (W_K^{(i)} H_K)^T]^T$.

3)

$$F_k^{(i)} = \left[\frac{V_k(:, \text{end})}{\|V_k(:, \text{end})\|_F}, \ldots, \frac{V_k(:, \text{end} - m_k + 1)}{\|V_k(:, \text{end} - m_k + 1)\|_F}\right],$$

thus beamforming matrixes $\{F_1^{(i)}, \ldots, F_K^{(i)}\}$ of all the users can be obtained.

4) calculating a user average SLNR pointer:

$$SLNR^{(i)} = \frac{1}{K} \sum_{k=1}^{K} \frac{\|W_k H_k F_k\|_F^2}{m_k \|W_k^{(i)} z_k\|_F^2 + \left\|\sum_{j=1, j \neq k}^{K} W_j^{(i)} H_j F_k\right\|_F^2};$$

5) if $i \geq 1$ and $|SLNR^{(i)} - SLNR^{(i-1)}| \leq \delta$ (herein $\delta$ is a small number), or $i = T_{max}$, where $T_{max}$ represents the maximum iteration number set for the iteration algorithm, turning to 6), otherwise i=i+1, then updating the received-merged matrix according to the receiver type, and turning to 2).

For example, with respect to the matched-filter receiver, the received-merged matrix may be updated by using the equation $$W_k^{(i)} = \frac{(H_k F_k^{(i-1)})^H}{\|H_k F_k^{(i-1)}\|_F},$$

and with respect to the MMSE receiver, the received-merged matrix may be updated by using the equation $$w_k^i = \left[(H_k F_k^{i-1})^H (H_k F_k^{i-1}) + \frac{N_k}{\rho} I_{N_l}\right]^{-1} (H_k F_k^{i-1})^H.$$

In the above equation, $F_k^{i-1}$ corresponds to the precoding vector (matrix) determined by the i−1$^{th}$ iteration of the $k^{th}$ user, $N_k$ corresponds to the number of streams transmitted by the $k^{th}$ user of the MU-MIMO system, and $\rho$ corresponds to the signal to noise ratio.

By updating the received-merged matrix according to the receiver type, the precoding vector at the transmitting end and the actually receiving processing vector are matched with each other, thereby improving the system performance.

6) $F_k=F_k^{(i)}$, $W_k=W_k^{(i)}$, where k=1, 2 . . . , K.

5) includes the iteration condition ($|SLNR^{(i)}-SLNR_{(i-1)}| \leq \delta$), which intuitively hopes to converge the optimized solutions of the nested beamforming matrix and received-merged matrix by using the iteration algorithm, i.e., to find a solution to which the maximum SLNR corresponds. When the algorithm tends to be convergent, the SLNR no longer increases obviously, and the iteration is broken to obtain the final result. In the procedure of the above processing, a maximum iteration number is set in consideration of the factors such as performance or system design.

Multi-Stream Beamforming Solution Combining the HARQ Mechanism

The multi-stream beamforming reduces the power or SNR of a certain data stream under the condition of high SNR, and transmits one or more new data stream(s) by reducing the power. According to related theory of Shannon channel capacity, the channel capacity is a logarithmic function with respect to the SNR, and the capacity increases more slowly with the rise of the SNR. Thus the multi-stream beamforming can greatly improve the entire transmission capacity without largely decreasing the data stream capacity.

However, when the number of streams is increased, the SNR of the whole system will be decreased, and the qualities of various transmission streams are quite different from each other. By combining the HARQ mechanism, the fairness between the transmission streams can be ensured effectively, and the throughput can be improved.

S(i) represents the $i^{th}$ transmission of the signal, and it is assumed that the channel matrix H(i) is the same for each transmission. After the HARQ is combined, when the transmission packet is detected as correct, an ACK is sent to the transmitting end to notify that the transmission packet no longer needs to be transmitted; otherwise an NACK is sent to require the transmission packet to be retransmitted. During the beamforming, the qualities of various streams are obviously different from each other, and according to the embodiment of the present invention, the system throughput can be maximized by using the HARQ mechanism.

For example, in the data transmission of the $k^{th}$ user, firstly a beamforming vector matrix can be obtained by using a multi-stream beamforming algorithm based on a minimum leakage principle (or other principle), and the beamforming vectors are arranged in an order of the eigenvalue size. During the transmission of a first packet for the data stream of each user, firstly the beamforming is orderly performed on each stream by using the obtained beamforming vector matrix. When an NACK signal is fed back to the transmitting end with respect to the previous transmission of a certain stream, the optimized beamforming vector in the beamforming vector matrix is allocated to the stream for beamforming, and the packet is retransmitted. When there is any other stream which feeds back an NACK signal to the transmitting end at the same time, the remaining beamforming vectors are orderly allocated and the packet is retransmitted. This solution improves the fairness between multiple transmission streams of the system in a cost of efficiency loss of the transmission stream with good quality. As the multi-stream beamforming improves the entire transmission capacity in a cost of decreasing the SNR under the condition of the high SNR, the solution improves the throughput while decreasing the SNR.

Figure 6:
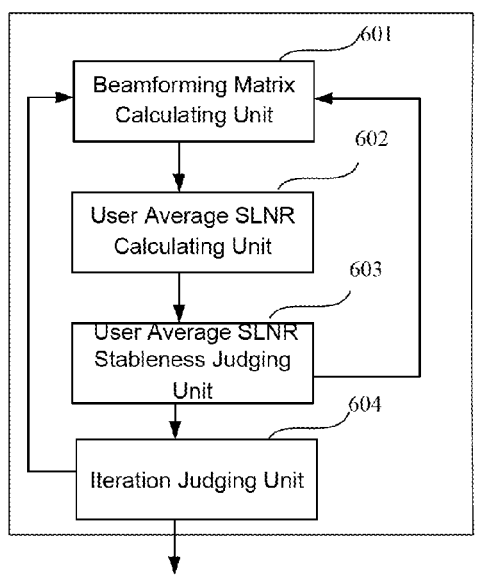
FIG. 6 illustrates a multi-user multi-stream beamforming apparatus according to an embodiment of the present invention.

FIG. 6 illustrates a multi-user multi-stream beamforming apparatus according to an embodiment of the present invention. As illustrated in FIG. 6, the apparatus includes a beamforming matrix calculating unit 601, a user average SLNR calculating unit 602 and a user average SLNR stableness judging unit 603.

The beamforming matrix calculating unit 601 is configured to calculate a beamforming matrix of each user in the multi-user according to a minimum leakage principle. The user average SLNR calculating unit 602 is configured to determine a user average SLNR of the multi-user according to the beamforming matrix of each user. The user average SLNR stableness judging unit 603 is configured to determine whether the user average SLNR is stable, wherein, if the user average SLNR is not stable, the beamforming matrix calculating unit recalculates the beamforming matrix of each user by using the calculated beamforming matrix of each user.

Figure 7:
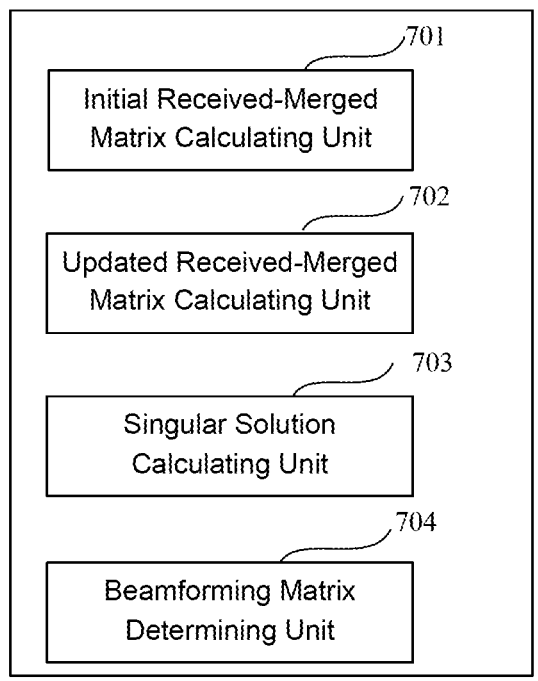
FIG. 7 illustrates a functional block diagram of a beamforming matrix calculating unit 601 according to an embodiment of the present invention.

FIG. 7 illustrates a functional block diagram of a beamforming matrix calculating unit 601 according to an embodiment of the present invention. As illustrated in FIG. 7, the beamforming matrix calculating unit includes an initial received-merged matrix calculating unit 701 configured to determine an initial received-merged matrix of each user in the multi-user; an updated received-merged matrix calculating unit 702 configured to determine an updated received-merged matrix of each user according to the previously calculated beamforming matrix of each user; a singular solution calculating unit 703 configured to calculate a singular solution based on the initial received-merged matrix or the updated received-merged matrix of each user according to a minimum leakage principle; and a beamforming matrix determining unit 704 configured to determine a beamforming matrix of each user by using the singular solution.

In addition, returning to FIG. 6, according to an embodiment of the present invention, the multi-user multi-stream beamforming apparatus may further include an iteration judging unit 604, which is an optional unit and configured to judge whether the user average SLNR stableness judging unit has performed a predetermined number of determinations, or whether the beamforming matrix calculating unit has performed the predetermined number of calculations of the beamforming matrix of each user, and end the processing if the predetermined number of determinations or the predetermined number of calculations of the beamforming matrix of each user have been performed.

Figure 8:
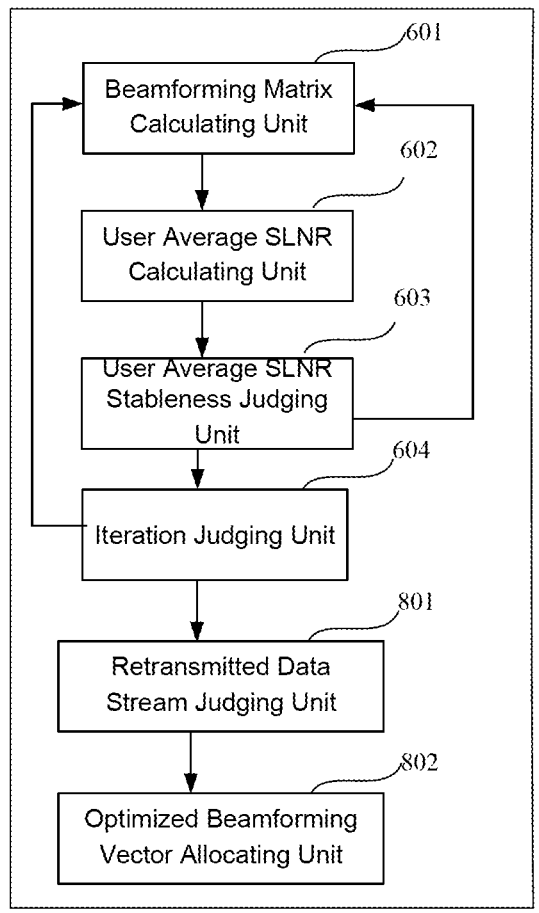
FIG. 8 illustrates a multi-user multi-stream beamforming apparatus according to another embodiment of the present invention.

FIG. 8 illustrates a multi-user multi-stream beamforming apparatus according to another embodiment of the present invention. Compared with the multi-user multi-stream beamforming apparatus as illustrated in FIG. 6, the multi-user multi-stream beamforming apparatus as illustrated in FIG. 8 further includes a retransmitted data stream judging unit 801 configured to judge whether there is a data stream to be retransmitted with respect to each user in the multi-user; and an optimized beamforming vector allocating unit 802 configured to select, when judge result of the retransmitted data stream judging unit is that there is a data stream to be retransmitted required by a user, an optimized beamforming vector is selected from the beamforming matrix of the user and allocated to the data stream; otherwise the beamforming vectors in the beamforming matrix of the user are allocated orderly.

Figure 9:
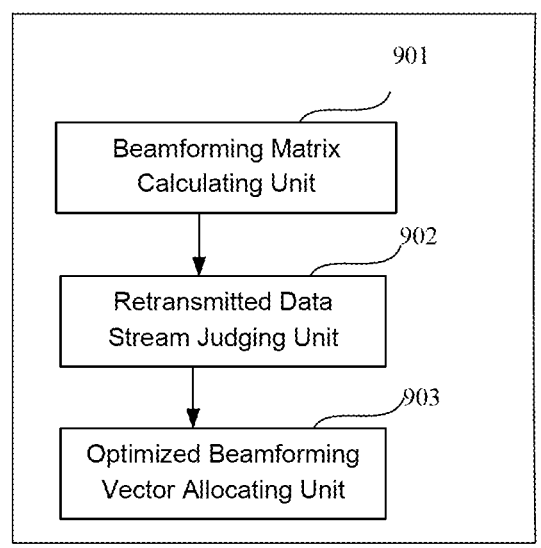
FIG. 9 illustrates a multi-user multi-stream beamforming apparatus according to still another embodiment of the present invention.

FIG. 9 illustrates a multi-user multi-stream beamforming apparatus according to still another embodiment of the present invention. As illustrated in FIG. 9, the apparatus includes a beamforming matrix calculating unit 901 configured to determine a beamforming matrix of each user in the multi-user; a retransmitted data stream judging unit 902 configured to judge whether there is a data stream to be retransmitted with respect to each user in the multi-user; an optimized beamforming vector allocating unit 903 configured to select, when the judge result of the retransmitted data stream judging unit is that there is a data stream to be retransmitted required by a user, an optimized beamforming vector is selected from the beamforming matrix of the user and allocated to the data stream.

The beamforming matrix calculating unit 901 may determine the beamforming matrix according to a minimum leakage principle, a Minimum Mean Square Error (MMSE) principle, etc.

In addition, the apparatus may further include a user average SLNR calculating unit configured to determine a user average SLNR of the multi-user according to the beamforming matrix of each user calculated by the beamforming matrix calculating unit; and a user average SLNR stableness judging unit configured to determine whether the user average SLNR is stable, wherein if the user average SLNR is not stable, the beamforming matrix calculating unit recalculates the beamforming matrix of each user by using the calculated beamforming matrix of each user.

The description of the apparatus and the description of the method may be understood with reference to each other. Features occurring in one embodiment may be applied to another embodiment in the same or similar way, so as to replace the features in another embodiment or used in combination therewith.

The above apparatus and method of the present invention may be implemented by hardware, or a combination of hardware and software. The present invention relates to a logic part readable program which when being executed by a logic part (executed directly or after an interpretation or compilation), enables the logic part to implement the above apparatus or constituent parts, or enables the logic part to implement the aforementioned methods or steps. The logic part for example may be a field programmable logic part, a microprocessor, a processor used in the computer, etc. The present invention further relates to a storage medium which stores the above program, such as hard disc, magnetic disc, optical disc, DVD, flash, magnetic optical disc, memory card, memory stick, etc.

The present invention is described as above in conjunction with specific embodiments. But a person skilled in the art shall appreciate that those descriptions are just exemplary, rather than limitations to the protection scope of the present invention. A person skilled in the art can make various modifications and amendments to the present invention based on the spirit and principle of the present invention, and those modifications and amendments also fall within the scope of the present invention.

What is claimed is:

1. A multi-user multi-stream beamforming apparatus, comprising:
a beamforming matrix calculating unit configured to calculate a beamforming matrix of each user in the multi-user according to a minimum leakage principle;
a user average Signal to Leakage Noise Ratio (SLNR) calculating unit configured to determine a user average SLNR of the multi-user according to the beamforming matrix of each user; and
a user average SLNR stableness judging unit configured to determine whether the user average SLNR is stable, wherein if $|SLNR^{(i)} - SLNR^{(i-1)}| \leq \delta$ ($\delta$ is a predetermined number), then it is judged that the user average SLNR is stable, where i represents a number of iterations, $SLNR^{(i)}$ represents a user average SLNR obtained at the $i^{th}$ iteration;
wherein if the user average SLNR is not stable, the beamforming matrix calculating unit recalculates the beamforming matrix of each user by using the calculated beamforming matrix of each user;
wherein the beamforming matrix calculating unit comprises:
an initial received-merged matrix calculating unit configured to determine an initial received-merged matrix of each user in the multi-user;
an updated received-merged matrix calculating unit configured to determine an updated received-merged matrix of each user according to the previously calculated beamforming matrix of each user;
a singular solution calculating unit configured to calculate a singular solution based on the initial received-merged matrix or the updated received-merged matrix of each user according to the minimum leakage principle; and
a beamforming matrix determining unit configured to determine a beamforming matrix of each user by using the singular solution.

2. The apparatus according to claim 1, wherein the initial received-merged matrix of each user is calculated by the initial received-merged matrix calculating unit by using the following equation:

$$\{W_k^{(i)}\}_{k=1,\ldots,K} = \frac{1}{\sqrt{m_k}} I_{m_k}([1:m_k],:);$$

where, K represents a total number of the multi-user, $m_k$ represents the number of receiving antennas of the $k^{th}$ user, I represents a unit matrix, $Im_k$ represents a noise matrix of the $k^{th}$ user, $Im_k([1:mk],:)$ represents the $1^{st}$ to $m_k^{th}$ lines of the matrix $Im_k$, and i represents a current number of iterations;

the singular solution is calculated by the singular solution calculating unit as follows:

$$[V_k, D_k] = \text{eig}(P_k, Q_k),$$

where $P_k = (W_k^{(i)} H_k)^H W_k^{(i)} H_k$, $Q_k = \sigma_k^2 I_{m_k} + \tilde{H}_k^H \tilde{H}_k$, $\tilde{H}_k = [(W_1^{(i)} H_1)^T, \ldots, (W_{k-1}^{(i)} H_{k-1})^T, (W_{k+1}^{(i)} H_{k+1})^T, \ldots, (W_K^{(i)} H_K)^T]^T$, the function eig (parameter 1, parameter 2) represents a generalized eigenvalue decomposition operation on (parameter 1, parameter 2), $W_k$ represents a receiving end merged matrix of the $k^{th}$ user, an element on the diagonal line of a diagonal matrix $D_k$ represents corresponding eigenvalue H represents a multi-antenna channel matrix of the $k^{th}$ user, the superscript H represents a matrix conjugate transposition, the superscript T represents a matrix transposition, $\sigma^2 k$ represents noise power of the $k^{th}$ user, $V_k$ represents a precoding matrix obtained according to the minimum leakage principle, a column vector of the matrix $v_k$ represents corresponding eigenvector; and the beamforming matrix of the $k^{th}$ user is calculated by the beamforming matrix determining unit using the following equation:

$$F_k^{(i)} = \left[ \frac{V_k(:,\text{end})}{\|V_k(:,\text{end})\|_F}, \ldots, \frac{V_k(:,\text{end} - m_k + 1)}{\|V_k(:,\text{end} - m_k + 1)\|_F} \right],$$

so as to obtain the beamforming matrix $\{F_1^{(i)}, \ldots, F_K^{(i)}\}$ of each user, where end represents a last value;

$V_k(:,\text{value parameter})$ represents a column indicated b the value parameter in the matrix $V_k$, where the subscript F represents a norm F.

3. The apparatus according to claim 1, further comprising:
a retransmitted data stream judging unit configured to judge whether there is a data stream to be retransmitted with respect to each user in the multi-user; and
an optimized beamforming vector allocating unit configured to select, when the retransmitted data stream judging unit judges that a user requires a data stream to be retransmitted, a beamforming vector corresponding to a channel having good channel quality from the beamforming matrix of the user and allocate to the data stream.

4. The apparatus according to claim 1, wherein,
the updated received-merged matrix calculating unit updates the received-merged matrix according to a receiver type, and recalculates the beamforming matrix of each user by using the calculated beamforming matrix of each user.

5. The multi-user multi-stream beamforming apparatus according to claim 1, wherein the multi-user multi-stream beamforming apparatus is included in a base station.

6. A multi-user multi-stream beamforming apparatus, comprising:
a beamforming matrix calculating unit configured to calculate a beamforming matrix of each user in the multi-user according to a minimum leakage principle;
a user average SLNR calculating unit configured to determine a user average SLNR of the multi-user according to the beamforming matrix of each user; and
a user average SLNR stableness judging unit configured to determine whether the user average SLNR is stable,
wherein if the user average SLNR is not stable, the beamforming matrix calculating unit recalculates the beamforming matrix of each user by using the calculated beamforming matrix of each user;
wherein the apparatus further comprises an iteration judging unit configured to judge whether the user average SLNR stableness judging unit has performed a predetermined number of determinations, or whether the beamforming matrix calculating unit has performed a predetermined number of calculations of the beamforming matrix of each user, and end the processing if the predetermined number of determinations or the predetermined number of calculations of the beamforming matrix of each user have been performed.

7. The apparatus according to claim 6, further comprising:
a retransmitted data stream judging unit configured to judge whether there is a data stream to be retransmitted with respect to each user in the multi-user; and
an optimized beamforming vector allocating unit configured to select, when the retransmitted data stream judging unit judges that a user requires a data stream to be retransmitted, a beamforming vector corresponding to a channel having good channel quality from the beamforming matrix of the user and allocate to the data stream.

8. The multi-user multi-stream beamforming apparatus according to claim 6, wherein the multi-user multi-stream beamforming apparatus is included in a base station.

9. A multi-user multi-stream beamforming apparatus, comprising:
a beamforming matrix calculating unit configured to calculate a beamforming matrix of each user in the multi-user according to a minimum leakage principle;
a user average Signal to Leakage Noise Ratio (SLNR) calculating unit configured to determine a user average SLNR of the multi-user according to the beamforming matrix of each user; and
a user average SLNR stableness judging unit configured to determine whether the user average SLNR is stable,
wherein if $|SLNR^{(i)} - SLNR^{(i-1)}| \leq \delta$ ($\delta$ is a predetermined number), then it is judged that the user average SLNR is stable, where i represents a number of iterations, $SLNR^{(i)}$ represents a user average SLNR obtained at the $i^{th}$ iteration;
wherein if the user average SLNR is not stable, the beamforming matrix calculating unit recalculates the beamforming matrix of each user by using the calculated beamforming matrix of each user;
wherein the beamforming matrix calculating unit comprises:
an initial received-merged matrix calculating unit configured to determine an initial received-merged matrix of each user in the multi-user;
an updated received-merged matrix calculating unit configured to determine an updated received-merged matrix of each user according to the previously calculated beamforming matrix of each user;
a singular solution calculating unit configured to calculate a singular solution based on the initial received-merged matrix or the updated received-merged matrix of each user according to the minimum leakage principle; and
a beamforming matrix determining unit configured to determine a beamforming matrix of each user by using the singular solution
a retransmitted data stream judging unit configured to judge whether there is a data stream to be retransmitted with respect to each user in the multi-user; and
an optimized beamforming vector allocating unit configured to select, when the retransmitted data stream judging unit judges that a user requires a data stream to be retransmitted, a beamforming vector corresponding to a channel having good channel quality from the beamforming matrix of the user and allocate to the data stream.

10. The multi-user multi-stream beamforming apparatus according to claim 9, wherein the multi-user multi-stream beamforming apparatus is included in a base station.

11. A multi-user multi-stream beamforming apparatus, comprising:
a beamforming matrix calculating unit configured to calculate a beamforming matrix of each user in the multi-user according to a minimum leakage principle;
a user average SLNR calculating unit configured to determine a user average SLNR of the multi-user according to the beamforming matrix of each user; and
a user average SLNR stableness judging unit configured to determine whether the user average SLNR is stable,
wherein if the user average SLNR is not stable, the beamforming matrix calculating unit recalculates the beamforming matrix of each user by using the calculated beamforming matrix of each user;
wherein the apparatus further comprises an iteration judging unit configured to judge whether the user average SLNR stableness judging unit has performed a predetermined number of determinations, or whether the beamforming matrix calculating unit has performed a predetermined number of calculations of the beamforming matrix of each user, and end the processing if the predetermined number of determinations or the predetermined number of calculations of the beamforming matrix of each user have been performed
a retransmitted data stream judging unit configured to judge whether there is a data stream to be retransmitted with respect to each user in the multi-user; and an optimized beamforming vector allocating unit configured to select, when the retransmitted data stream judging unit judges that a user requires a data stream to be retransmitted, a beamforming vector corresponding to a channel having good channel quality from the beamforming matrix of the user and allocate to the data stream.

12. The multi-user multi-stream beamforming apparatus according to claim 11, wherein the multi-user multi-stream beamforming apparatus is included in a base station.

* * * * *